United States Patent
Koyanagi

(10) Patent No.: US 6,516,403 B1
(45) Date of Patent: Feb. 4, 2003

(54) SYSTEM FOR SYNCHRONIZING USE OF CRITICAL SECTIONS BY MULTIPLE PROCESSORS USING THE CORRESPONDING FLAG BITS IN THE COMMUNICATION REGISTERS AND ACCESS CONTROL REGISTER

(75) Inventor: Hisao Koyanagi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/300,465

(22) Filed: Apr. 28, 1999

(51) Int. Cl.[7] .............................................. G06F 9/30
(52) U.S. Cl. ...................... 712/203; 712/22; 712/225; 712/226; 709/248
(58) Field of Search ........................ 710/244; 711/151, 711/152; 712/22, 226, 225, 204, 203; 395/375, 479, 425, 474; 709/248

(56) References Cited

U.S. PATENT DOCUMENTS

| | | | |
|---|---|---|---|
| 5,321,825 A | * 6/1994 | Song | 395/425 |
| 5,566,319 A | * 10/1996 | Lenze | 395/474 |
| 5,634,037 A | * 5/1997 | Sasaki et al. | 395/479 |
| 5,659,784 A | * 8/1997 | Inaba et al. | 395/726 |
| 5,787,301 A | 7/1998 | Arakawa et al. | 395/800.2 |
| 5,928,334 A | * 7/1999 | Mandyam et al. | 709/248 |

FOREIGN PATENT DOCUMENTS

| | | |
|---|---|---|
| JP | 5-002568 | 1/1993 |
| JP | 7-262139 | 10/1995 |
| JP | 9-044460 | 2/1997 |

* cited by examiner

Primary Examiner—Meng-Al T. An
Assistant Examiner—Jinsong Hu
(74) Attorney, Agent, or Firm—Foley & Lardner

(57) ABSTRACT

A hardware arrangement for implementing synchronization control between multiple processors is disclosed. The hardware arrangement is provided with a plurality of communication registers which are arranged so as to store synchronization control data applied from the processors. A flag bit register generates a plurality of flag bits which are respectively assigned to a plurality of critical sections. Each of the flag bits indicates whether or not the corresponding critical section is available. In order to assure the mutual exclusion control, a flag bit access control register is provided which generates a plurality of control bits that are respectively assigned to the plurality of flag bits. The control bit is used to prevent two processors from using an identical critical section. A controller is provided so as to adequately control the above-mentioned registers.

2 Claims, 5 Drawing Sheets

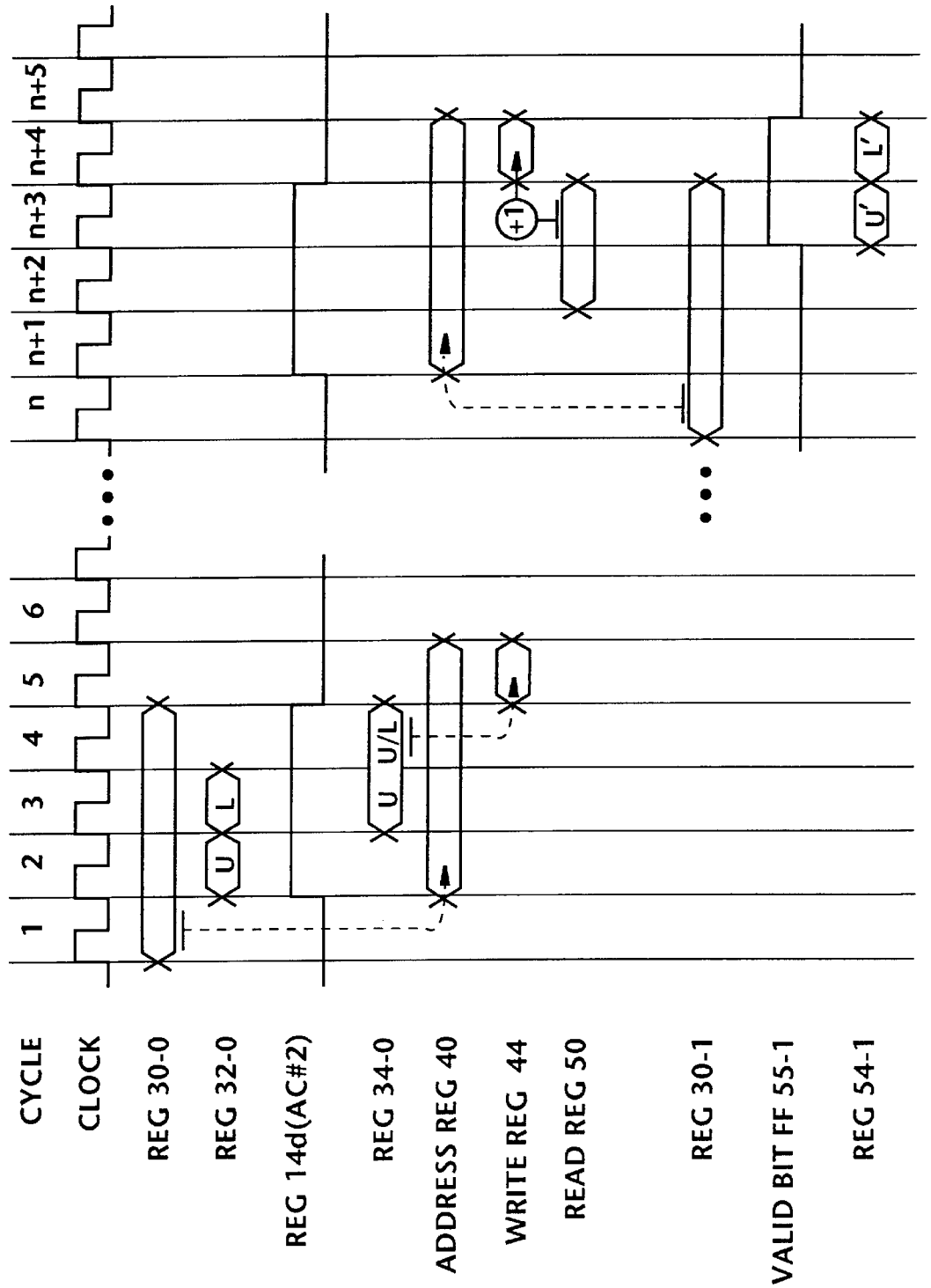

SYSTEM FOR SYNCHRONIZING USE OF CRITICAL SECTIONS BY MULTIPLE PROCESSORS USING THE CORRESPONDING FLAG BITS IN THE COMMUNICATION REGISTERS AND ACCESS CONTROL REGISTER

BACKGROUND OF THE INVENTION

1. Field of the Invention

The present invention relates generally to techniques for effectively controlling synchronization of multiple processors using so-called communication registers, and more specifically to a hardware arrangement for accelerating reply to a processor when the processor inquires if a critical section is available thereto.

2. Description of the Related Art

It is known in the art that in a multiple processor system, it is essential to provide synchronization between the processors when they use critical sections or critical resources. A critical section implies part of a process (task or program) that must be executed indivisibly. In order to achieve exclusive control between the cooperative processors, it is common to provide a flag bit unit including a plurality of flag bits (semaphores) which are respectively allocated to the critical sections. When a processor is going to use one critical section, the processor issues is test-and-set instruction in order to check to determine if the corresponding flag bit assumes a logic level 0 (for example) that indicates availability of the critical section. When the critical section is found available, the processor sets a logic level 1 at the flag bit in order to indicate that the critical section is rendered unavailable, after which the processor starts to use the critical section. When the processor terminates the use of the critical section, the processor sets a logic level 0 at the flag bit for releasing the exclusive use of the critical section thereby.

On the other hand, especially in the case of a supercomputer, it is advantageous to provide a plurality of high-speed registers, called "communication registers", which are used to hold shared variables for executing synchronization controls, mutual exclusion controls, communication controls between the processors, etc. By way of example, the communication registers are disclosed in U.S. Pat. No. 5,659,784 to Inaba et al. One simple example of operation of the communication registers will be described for the sake of a better understanding of the present invention. A plurality of processors, whose number is assumed one hundred (100), sequentially access one communication register and retrieve a variable stored therein. Each time one processor retrieves the variable, the variable is incremented by one and then stored in the same communication register. The processor implements a calculation using the variable retrieved from the register. The operation of one cycle, for which all the processors have respectively retrieved the variable one time, is repeated $2^{40}$ times (for example). This operation is referred to as a fetch-and-increment operation. In order to store such a variable whose bit length reaches more than 40, each communication register is configured so as to store a 64-bit word (for example).

In the case where the communication registers are used, it is preferable to use some of the registers so as to implement synchronization control between the processors when they use critical sections (viz, mutual extension control). In this instance, it goes without saying that there is no need for providing the flag bit unit that is dedicated to the synchronization control of the processors regarding the critical sections. More specifically, in the above case, one bit of each communication register is used or specified as a flag bit. Therefore, when a processor intends to use one critical section, the processor issues a test-and-set instruction in order to determine if the corresponding flag bit, embedded in the communication register, assumes a logic level 0 (for example) that indicates availability of the critical section. In order to check the flag bit, it is necessary to retrieve the whole content of the communication register and store the same in a suitable work space wherein the flag bit is checked to determine if the critical section is available.

It is understood that this conventional technique suffers from the problem that the flag bit information to be delivered to the processor, which has issued the test-and-set instruction, is undesirably delayed. It is known that, as the size of a program executed in parallel becomes smaller, there is a tendency that the size of each of unit tasks (unit processes) is reduced. In such a case, the frequency of issuance of the test-and-set instructions increases, which enhances the aforesaid problem of delaying an overall time of the program execution.

SUMMARY OF THE INVENTION

It is therefore an object of the present invention to provide techniques for rapidly providing a processor with a reply of whether or not a critical section is available when a plurality of communications registers are used for synchronization control of the processors.

The object is fulfilled by a hardware arrangement for implementing synchronization control between multiple processors, which hardware arrangement is provided with a plurality of communication registers which are arranged so as to store synchronization control data provided by the processors. A flag bit register holds a plurality of flag bits which are respectively assigned to a plurality of critical sections. Each of the flag bits indicates whether the corresponding critical section is available. In order to assure the mutual exclusion control, a flag bit access control register is provided which holds a plurality of control bits that are respectively assigned to the plurality of flag bits. Each of the control bits indicates whether a corresponding flag bit may be accessed by a processor, to thereby prevent two processors from using an identical critical section. A controller is provided so as to adequately control the above-mentioned registers. The controller sets a control bit of the access control register corresponding to a flag bit of the flag bit register during receipt of synchronization control data from a processor to prevent access to that flag bit by other processors.

One aspect of the present invention resides in a hardware arrangement for implementing synchronization control between multiple processors, comprising: a plurality of communication registers arranged so as to store synchronization control data provided by the processors; a flag bit register for holding a plurality of flag bits which are respectively assigned to a plurality of critical sections, each of the flag bits indicating whether the corresponding critical section is available; a flag bit access control register for holding a plurality of control bits which are respectively assigned to the plurality of flag bits, each of the control bits indicating whether a corresponding flag bit may be accessed by a processor to prevent two processors from using an identical critical section; and a controller for controlling the communication registers, the flag bit register, and the flag bit access control register, the controller setting a control bit of the access control register corresponding to a flag bit of the flag bit register during receipt of synchronization control data from a processor to prevent access to that flag bit by other processors.

BRIEF DESCRIPTION OF THE DRAWINGS

The features and advantages of the present invention will become more clearly appreciated from the following description taken in conjunction with the accompanying drawings in which like member or elements are denoted by like reference numerals and in which:

FIG. 5 is a timing chart for describing another operation of the CR unit of FIG. 2.

DETAILED DESCRIPTION OF THE PREFERRED EMBODIMENTS

Figure 1:
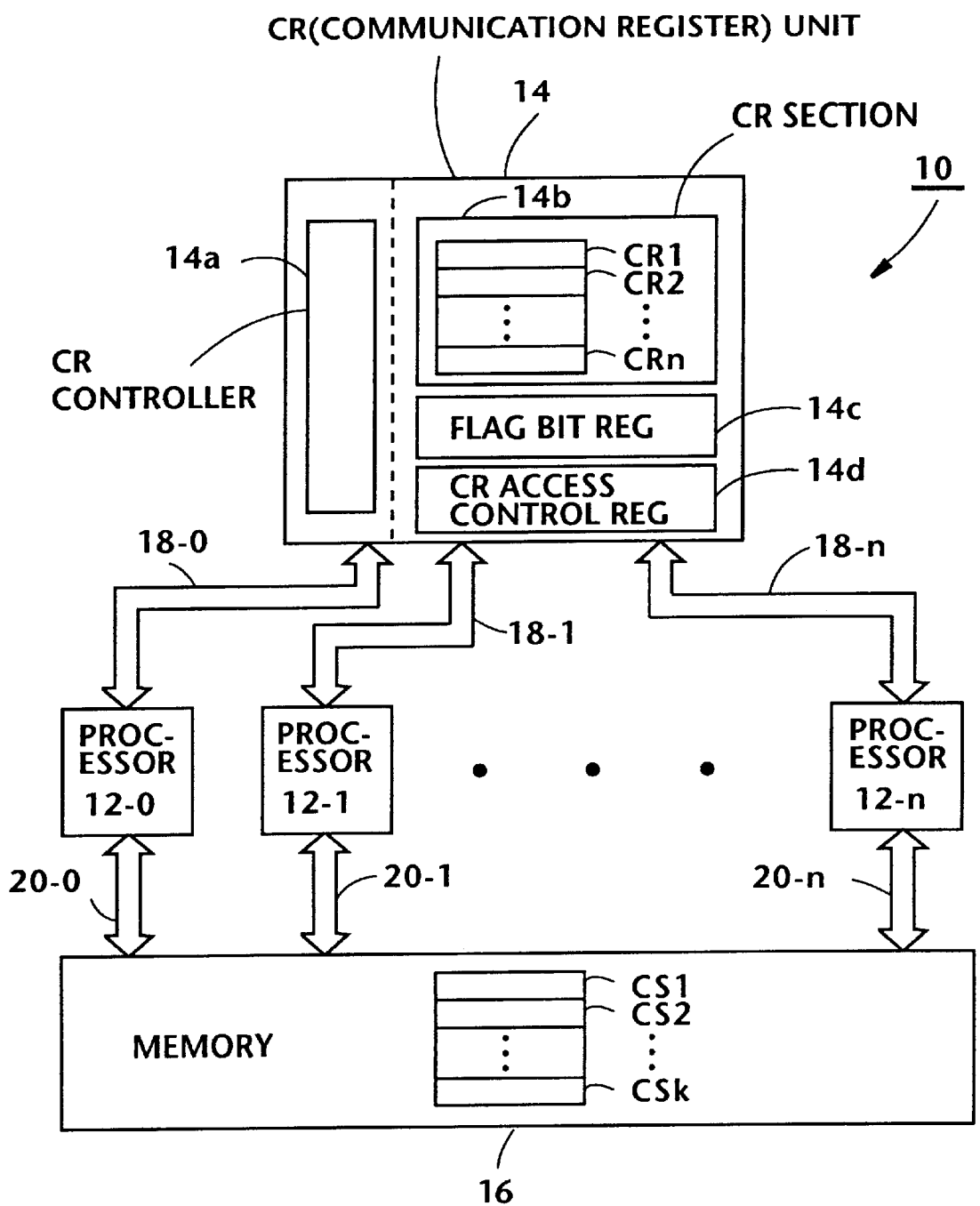
FIG. 1 is a diagram schematically showing an arrangement wherein a communication register (CR) unit to which the present invention is applicable is provided.

An embodiment of the present invention will be described with reference to FIGS. 1–5. As shown in FIG. 1, a hardware arrangement 10 to which the present invention is applicable, generally comprises a plurality of multiple processors 12-0 to 12-n that operate independently of one another but must be synchronized when executing an identical critical section (or exclusive resource). The processors 12-0 to 12-n are operatively provided between a communication register (CR) unit 14 and a memory 16 by way of bus lines 18-0 to 18-n and 20-0 to 20-n.

The CR unit 14 comprises a CR controller 14a for controlling the overall operation of the unit 14, a CR section 14b having a plurality of communication registers (depicted by CR1–CRn), a flag bit register 14c, and a flag bit access control register 14d. The memory 16, which are shared by the processors 12-0 to 12-n, has a memory area wherein a plurality of critical sections CS1 to CSk are stored. Each time a processor wishes to use a critical section, the processor should access the CR unit 14 and ascertain the availability of the critical section.

Figure 2:
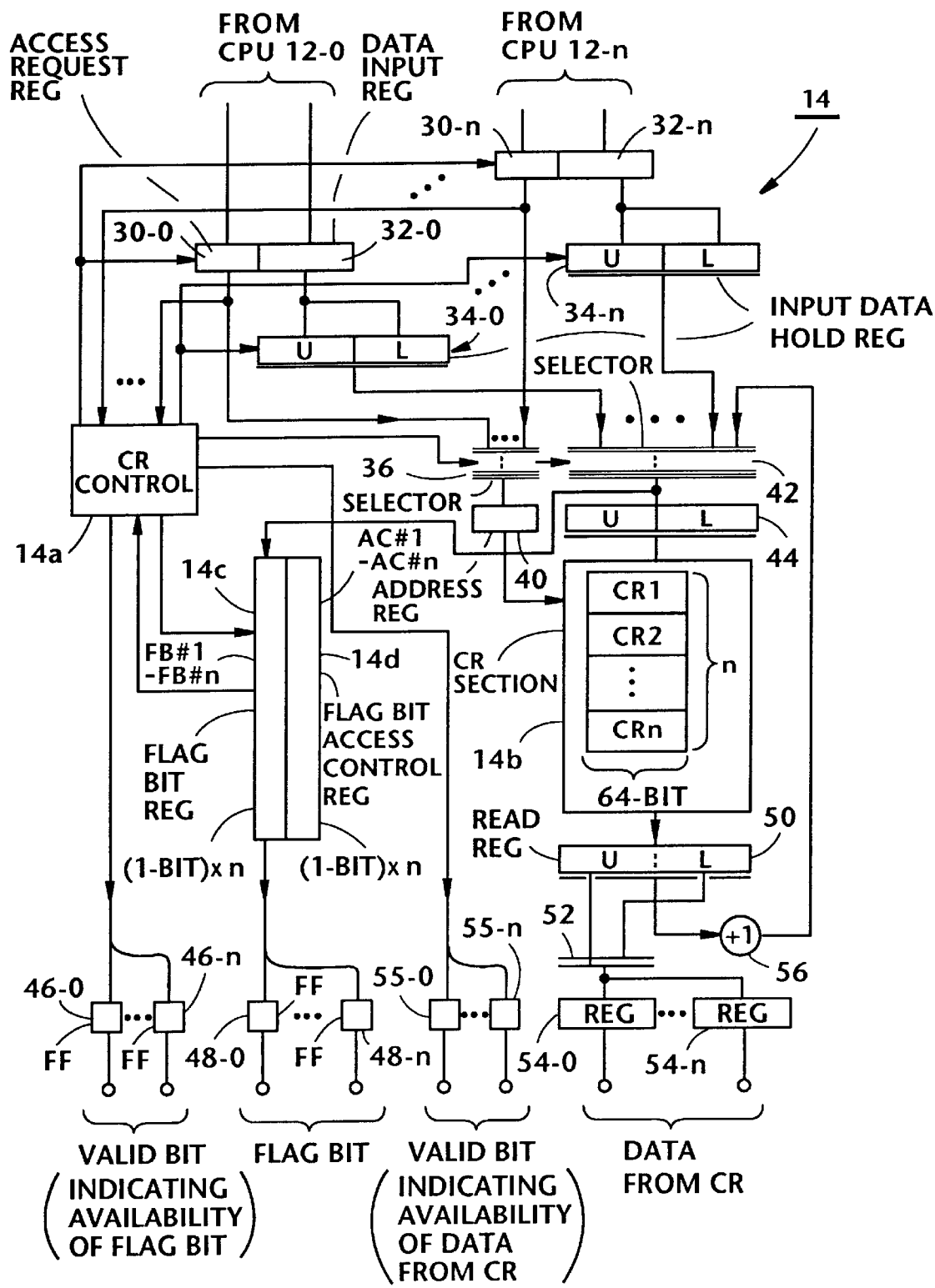
FIG. 2 is a diagram showing in detail the CR unit of FIG. 1.

Referring to FIG. 2, the arrangement of the CR unit 14 is illustrated in detail. As shown, a plurality of access request registers 30-0 to 30-n is provided so as to respectively receive CR access requests from the processors 12-0 to 12-n. It is to be noted that the CR unit 14 is able to receive one CR access request during one operation cycle. Further, a plurality of data input registers 32-0 to 32-n is provided in a manner to respectively receive data (operand) attached to the CR access requests. In order to simplify the circuit arrangement, each data is applied to the corresponding register 32 in a manner divided in halves. Thus, each of input data hold registers 34-0 to 34-n stores the whole data using two operation cycles.

The CR controller 14a is operatively coupled to the access request registers 30-0 to 30-n and receives therefrom the CR access requests including CR address data. A selector 36 is coupled to the access request registers 30-0 to 30-n and selects one address data under the control of the CR controller 14a. The selected address data is stored in an address register 40. In a similar manner, a selector 42 is coupled to the input data hold registers 34-0 to 34-n and selects one data under the control of the CR controller 14a. The selected data is applied to a write register 44 end then written into one of the communication registers CR1 to CRn, which is determined by address data stored in the register 40.

The flag bit register 14c is comprised of "n" flip-flops (FFS) whose outputs (viz., flag bits) are respectively depicted by FB#1 to FB#n. Each of the flag bits FB#1 to FB#n indicates whether or not the corresponding critical section is available. More specifically, if the flag bit assumes a logic 0, then the corresponding critical section is available, and on the contrary, if the flag bit assumes a logic 1, the corresponding critical section is unavailable.

The flag bit access control register 14d is comprised of "n" flip-flops (FFs) whose outputs (viz., access control bits) are respectively depicted by AC#1 to AC#n. By way of example, let us consider the case where the CR controller 14a responds to the CR access request from the processor 12-0 and sets a logic level 1 to the access control bit AC#2. In such a case, the controller 14a prohibits that any other processor from accessing the information of the corresponding flag bit FB#2 until the access control bit AC#2 again resumes a logic level 0. This is to assure a mutual exclusion control of critical sections, which will become clear as the description proceeds.

Flip-flops (FF) 46-0 to 46-n respectively generate valid bits which respectively indicate validity of the corresponding flag bits outputted from flip-flops (FF) 48-0 to 48-n. It is understood that the outputs of the FFs 48-0 to 48-n respectively represent the logic levels of the flag bits FB#1 to FB#n. The FPs 46-0 to 46-n are respectively coupled to the processors 12-0 to 12-n, which is applicable to another FFs 48-0 to 48-n.

The data retrieved from the CR section 14b is temporally stored in a read register 50 and then applied to one of the processors 12-0 to 12-n via a selector 52 and one of register 54-0 to 54-n. The data appearing at the register 54-0 (for example) is validated by a valid bit appearing at a valid bit flip-flop 55-0. A counter 56 is provided between the read register 50 and the selector 42, and the operation of the counter 56 will be described later.

The instant embodiment is further described with reference to FIGS. 3 to 5. Assuming that the bit length of each of the communication registers CR1 to CRn is 64 as illustrated in FIG. 2.

Figure 3A:
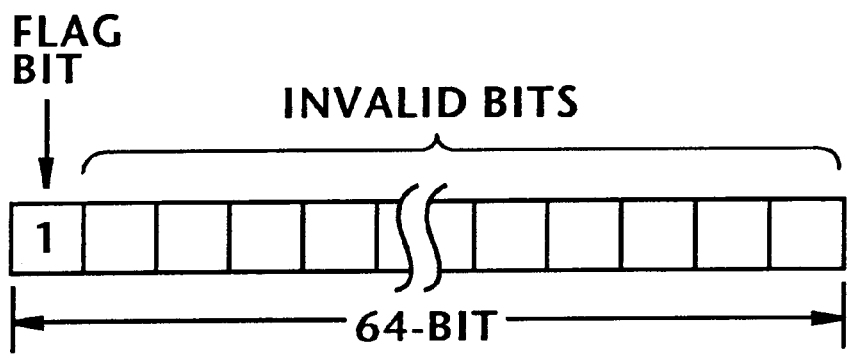
FIGS. 3A, 3B, and 3C each show a format of the data accompanying a CR access request from a processor.
Figure 3B:
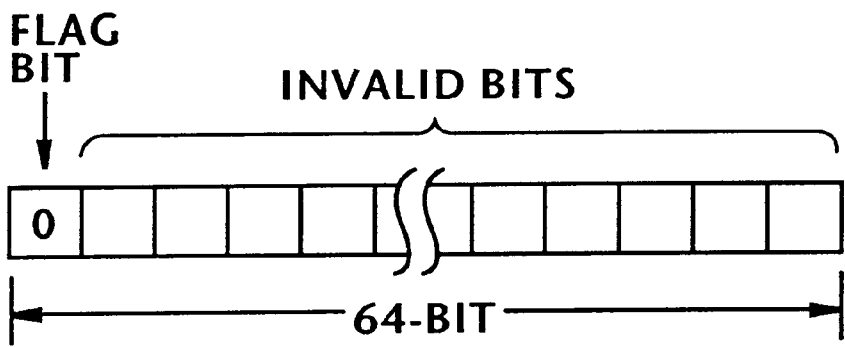

When a processor issues a test-and-set (TS) instruction in an attempt to initiate the exclusive use of a critical section, the TS instruction accompanies the data shown in FIGS. 3A. That is, the data carries a flag bit which is typically positioned at the leftmost of the 64 bits and which assumes a logic level 1. The remaining 63 bits are not used in this case (viz., they are invalid bits) as indicated in FIG. 3A. On the other hand, when a processor is going to release the critical section previously obtained, the processor supplies the CR unit 14 with an instruction of unlocking (viz., rendering available) the critical section. In this case, the instruction for releasing the critical section accompanies the data as shown in FIG. 3B, which data includes the above mentioned flag bit with a logic level 0. It is to be noted that the present invention is in no way limited to the aforesaid position of the flag bit within the communication register.

Figure 3C:
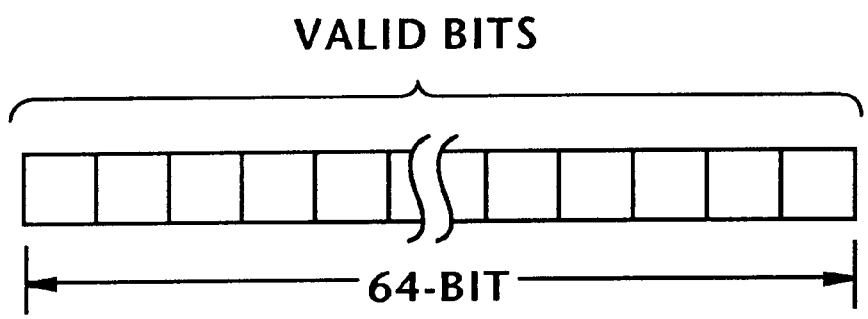

FIG. 3C is a sketch showing the case where a communication register is used to store a shared variable for executing synchronization controls, communication controls between the processors, etc., as mentioned in the opening paragraphs. In this case, all the bits of the communication register are valid.

Figure 4:
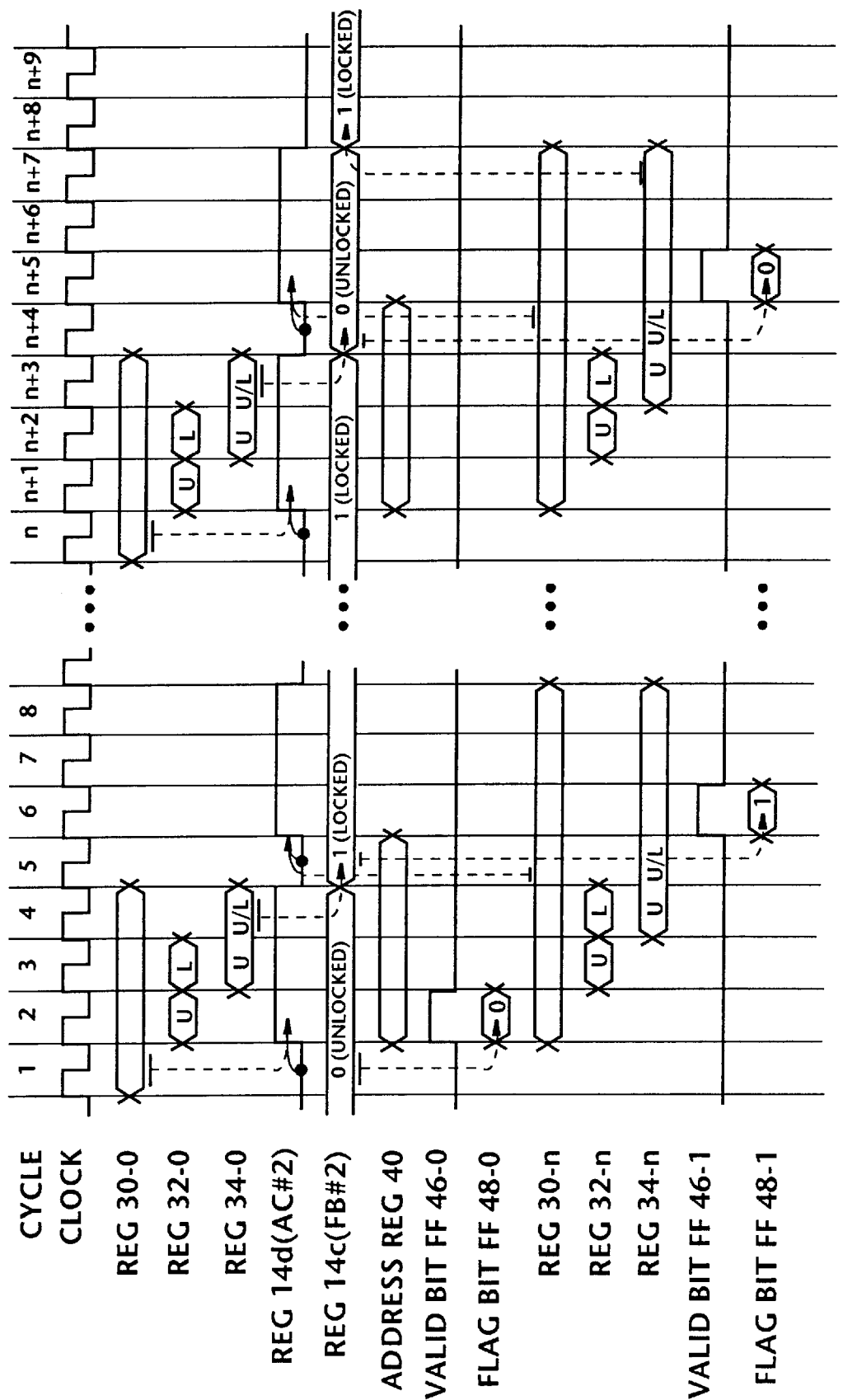
FIG. 4 is a timing chart for describing operation of the CR unit of FIG. 2.

FIG. 4 is a timing chart showing a manner wherein a processor exclusively obtains a critical section and thereafter releases the same which is in turn exclusively obtained by another processor. It should be noted that in this case, there exists no data write/read operations in connection with the CR section 14b.

Assuming that the processor 12-0 intends to exclusively use the critical section CS2 and thus, applies a test-and-set (TS) instruction to the access request register 30-0 (FIG. 2) at Cycle 1 (FIG. 4). The TS instruction is retained in the register 30-0 at Cycle 1. The CR controller 14*a* acquires, at Cycle 1, an address included in the TS instruction form the processor 12-0 and held in the register 30-0. Further, assuming that the flag bit FB#2 of the flag bit register 14*c* remains at a logic level 0 at Cycle 1 and thus, the critical section CS2 is available at Cycle 1 (viz., unlocked), the CR controller 14*a* is able to know that the flag bit FB#2 has a logic level 0 at Cycle 1. Therefore, the CR controller 14*a* allows the valid bit flip-flop 46-0 to assume a logic level 1 at Cycle 2 thereby to validate the output of the flip-flop 48-0, at Cycle 2, which reflects the content (viz., logic level 0) of the flag bit FB#2. The processor 12-0 is able to know that the critical section CS2 is available at Cycle 2. The data input register 32-0 also stores, at Cycle 2, an upper half portion of data applied from the processor 12-0 and, at Cycle 3, the lower half portion thereof.

As mentioned above, the application of halves of data over two cycles is merely to simplify the hardware arrangement and thus there exists no direct relationship with the instant invention. The input data hold register 34-0 receives the upper and lower portions of the incoming data over Cycles 3 and 4. Since the processor 12-0 intends to exclusively use the critical section CS2, the access control bit AC#2 assumes a logic level 1 during Cycles 2–4 in order to ensure the mutual exclusion control of the critical sections. That is, the content of the flag bit FB#2 is not available, during Cycles 2–4, to any processor other than the processor 12-0 in this particular case.

Since the processor 12-0 issues a CR access request for obtaining exclusive use of the critical section, the data stored in the register 34-0 is shown in FIG. 3A. In response to the data applied to the flag bit register 14*c*, the CR controller 14*a* sets, at Cycle 5, the flag bit FB#2 so as to assume a logic level 1. This means that the corresponding critical section CS2 is rendered unavailable (viz., locked).

Assume the processor 12-n issues, at Cycle 2, a test-and-set (TS) instruction in order to exclusively use the critical section CS2. The TS instruction is held in the access request register 30-n at Cycle 2, and the data input register 32-n is supplied with the data attached to the TS instruction, and stores therein the data during Cycles 3 and 4. Further, the upper data is held in the register 34-n at Cycle 4 and both the upper and lower data are held in the register 34-n at Cycle 5.

As mentioned above, the access control bit AC#2 assumes a logic 1 during Cycles 2–4 in response to the CR access request issued from the process 12-0, and therefore, the flag bit FB#2 is unavailable to the processor 12-n during Cycles 2–4. However, at Cycle 5, the access control bit AC#2 falls to a logic level 0, and, at the same cycle, the register 30-n holds the CR access request from the processor 12-n. As such, the access control bit AC#2 again assumes, at Cycle 6, a logic level 1 for the processor 12-n. As a result, the processor 12-n is able to receive the content of the flag bit FB#2, which indicates that the critical section CS2 is unavailable to the processor 12-n.

When the processor 12-0 terminates the exclusive use of the critical section CS2, the processor 12-0 should issue the CR access request for releasing the critical section CS2. The operation is implemented over Cycles n-(n+4) as shown in FIG. 4, which operation is clearly understood from the above description and thus further description will be omitted for brevity. In this case, the data, which accompanies the CR access request, is shown in FIG. 3B as mentioned above.

At Cycle (n+1), the processor 12-n again tries to obtain a right of exclusive use of the critical section CS2. The processor 12-n is able to confirm that the critical Section CS2 has been released and become available thereto at Cycle (n+5). Thereafter, the CR controller 14*a* sets a logic level 1 to the flag bit FB#2 at Cycle (n~8) for excluding the usage of the critical section CS2 other than the processor 12-n.

FIG. 5 is a timing chart for describing another operation of the CR unit 14, which differs from the operation discussed with reference to FIG. 4. That is, the CR section 14*b* is used to hold one or more shared variables for executing synchronization control between the processors 12-0 to 12-n. The operation per se is not directly concerned with the present invention and as such, a brief description will be given for simplifying the disclosure.

FIG. 5 is a timing chart showing that the processor 12-0 accesses the CR unit 14 and writes an initial value at the CR2. Thereafter, the next processor 12-1 makes access to the CR unit 14 and retrieves the initial value (variable stored in the CR2. The initial value, which has been retrieved from the CR2 and held in the read register 50, is incremented by one at the counter 56. The incremented variable is stored in the CR2 by way of the selector 42 and the write register 44. This operation is a fetch-and-increment operation which is applicable to the case as described in the opening paragraphs. The above-mentioned variables are control data for providing synchronization between the processors.

It will be understood that the above disclosure is representative of only one possible embodiment of the present invention and that the concept on which the invention is based is not specifically limited thereto.

What is claimed is:

1. A hardware arrangement for implementing synchronization control between multiple processors, comprising:

a plurality of communication registers arranged so as to store synchronization control data provided by said processors;

a flag bit register for holding a plurality of flag bits which are respectively assigned to a plurality of critical sections, each of said flag bits indicating whether the corresponding critical section is available;

a flag bit access control register for holding a plurality of control bits which are respectively assigned to said plurality of flag bits, each of said control bits indicating whether a corresponding flag bit may be accessed by a processor to prevent two processors from using an identical critical section; and a controller for controlling said communication registers, said flag bit register, and said flag bit access control register, the controller setting a control bit of said access control register corresponding to a flag bit of said flag bit register during receipt of synchronization control data from a processor to prevent access to that flag bit by other processors.

2. A hardware arrangement as claimed in claim 1, wherein said critical sections are stored in a memory shared by said plurality of processors.

* * * * *